United States Patent
Xing

(10) Patent No.: US 10,462,275 B2
(45) Date of Patent: Oct. 29, 2019

(54) PORTABLE MOBILE PHONE BRACKET

(71) Applicant: Haoyu Xing, Shenzhen (CN)

(72) Inventor: Haoyu Xing, Shenzhen (CN)

( * ) Notice: Subject to any disclaimer, the term of this patent is extended or adjusted under 35 U.S.C. 154(b) by 0 days.

(21) Appl. No.: 15/777,216

(22) PCT Filed: Nov. 20, 2015

(86) PCT No.: PCT/CN2015/095099
§ 371 (c)(1),
(2) Date: May 18, 2018

(87) PCT Pub. No.: WO2017/084082
PCT Pub. Date: May 26, 2017

(65) Prior Publication Data
US 2018/0343333 A1    Nov. 29, 2018

(51) Int. Cl.
*H04M 1/04* (2006.01)
*F16M 13/02* (2006.01)
*F16M 11/16* (2006.01)
*F16M 11/10* (2006.01)
*F16M 11/20* (2006.01)

(52) U.S. Cl.
CPC .............. *H04M 1/04* (2013.01); *F16M 11/10* (2013.01); *F16M 11/16* (2013.01); *F16M 13/022* (2013.01); *F16M 11/2021* (2013.01)

(58) Field of Classification Search
CPC .. E05Y 2900/606; G06F 1/1681; F16M 11/10
USPC ..................... 455/575.1, 90.1–90.3
See application file for complete search history.

(56) References Cited

U.S. PATENT DOCUMENTS

| 7,540,466 B2 | 6/2009 | Yang | |
|---|---|---|---|
| 2009/0020660 A1* | 1/2009 | Yang | F16M 11/10 248/126 |

FOREIGN PATENT DOCUMENTS

| CN | 2610207 Y | 4/2004 |
|---|---|---|
| CN | 201166755 Y | 12/2008 |
| CN | 201779414 U | 3/2011 |
| CN | 102042467 B | 1/2013 |
| CN | 204459643 U | 7/2015 |
| CN | 204459648 U | 7/2015 |
| CN | 105318156 A | 2/2016 |
| CN | 105318157 A | 2/2016 |

(Continued)

OTHER PUBLICATIONS

Leo Xu, The International Searching Authority written comments, Jul. 2016, CN.

*Primary Examiner* — Sam Bhattacharya

(57) ABSTRACT

The present disclosure provides a portable mobile phone bracket which includes a base. A supporting plate is arranged on the base. The base is connected to the supporting plate through a connection portion. The connection portion includes a first sliding seat fixed with the base. A first clamping groove used for fixation is formed in the first sliding seat. The connection portion includes a fixed clamping seat matched with the first clamping groove. The fixed clamping seat drives the supporting plate to rotate. The connection portion includes a regulating rod used to regulate the fixed clamping seat to match with the first clamping groove. The regulating rod is axially movable. The regulating rod penetrates through one end of the supporting plate and is fixedly connected to the fixed clamping seat. The other end of the regulating rod is provided with a pressing device.

9 Claims, 4 Drawing Sheets

(56) References Cited

FOREIGN PATENT DOCUMENTS

| | | |
|---|---|---|
| CN | 105318158 A | 2/2016 |
| CN | 105318159 A | 2/2016 |
| CN | 105318172 A | 2/2016 |
| CN | 205191121 U | 4/2016 |
| CN | 205191122 U | 4/2016 |
| CN | 205191163 U | 4/2016 |
| CN | 205315973 U | 6/2016 |
| JP | H08307500 A | 11/1996 |
| JP | 2002335316 A | 11/2002 |

* cited by examiner

PORTABLE MOBILE PHONE BRACKET

TECHNICAL FIELD

The present disclosure relates to the field of machines, and more particularly to a portable mobile phone bracket.

BACKGROUND

The inventor has designed a portable mobile phone bracket which comprises a base. A supporting plate is arranged on the base. The base is connected to the supporting plate through a connection portion. The connection portion comprises first sliding seat fixed with the base. A first clamping groove used for fixation is formed in the first sliding seat. The connection portion comprises a fixed clamping seat matched with the first clamping groove. The fixed clamping seat drives the supporting plate to rotate. The connection portion comprises a regulating rod used to regulate the fixed clamping seat to match with the first clamping groove. The regulating rod is axially movable. An angle of the bracket is regulated by pressing the regulating rod. A contact area between the regulating rod and a finger is small, so pressing is not convenient.

SUMMARY

The purpose of the present disclosure is to provide a portable mobile phone bracket capable of bringing convenience and comfort in pressing.

The purpose of the present disclosure is achieved by the following technical solution:

A portable mobile phone bracket comprises a base. A supporting plate is arranged on the base. The base is connected to the supporting plate through a connection portion. The connection portion comprises a first sliding seat fixed with the base. A first clamping groove used for fixation is formed in the first sliding seat. The connection portion comprises a fixed clamping seat matched with the first clamping groove. The fixed clamping seat drives the supporting plate to rotate. The connection portion comprises a regulating rod used to regulate the fixed clamping seat to match with the first clamping groove. The regulating rod is axially movable. The regulating rod penetrates through one end of the supporting plate and is fixedly connected to the fixed clamping seat. The other end of the regulating rod is provided with a pressing device.

Further, the pressing device comprises a pressing cover and a fixing portion. A fixing through hole is formed in the fixing portion. The regulating rod is fixedly connected with the fixing portion through the fixing through hole. The pressing cover is matched with the fixing portion. In this way, the regulating rod is controlled very conveniently through the pressing cover. Meanwhile because the pressing cover increases the area of a contact surface in pressing, pressing operation brings more comfort and fingers are not easy to scratch.

Further, a fixing buckle is arranged on the pressing cover. A fixing bayonet is arranged on the fixing portion. The fixing buckle and the fixing bayonet are matched and connected through a buckle. In this way, assembly of the pressing cover and the fixing portion is convenient. This manner ensures firm fixation, greatly enhances durability of the bracket, also ensures convenient and simple disassembly, facilitates replacement of components and realizes economy and environmental protection.

Further, a regulating rod butting rod is arranged on the pressing cover. An end of the regulating rod butting rod comes into close contact with an end of the regulating rod. In this way, the end of the regulating rod butting rod butts the end of the regulating rod to better enhance tight connection between the fixing portion and the regulating rod, thereby playing a dual-fixation effect, so that the bracket is more durable.

Further, a first protrusion matched with the first clamping grog e is arranged on the fixed clamping seat. The fixed clamping seat comprises a first clamping column located the first sliding seat and a second clamping column matched with the supporting plate. The first protrusion is arranged on the first clamping column. One end of the first sliding seat is provided with a first convex ring extending radially to limit the first clamping column. Through such arrangement, a good fixation effect is played to the fixed clamping seat. Meanwhile, the fixed clamping seat is limited to prevent the fixed clamping seat from sliding out due to improper control. Meanwhile, clamping and separation of the fixed clamping seat and the first clamping groove are easily controlled, thereby better regulating an inclined angle of the supporting plate and bringing convenient use.

Further, a second protrusion is arranged on the second clamping column. A supporting plate through hole is formed in the supporting plate. A supporting plate clamping groove matched with the second protrusion is formed in the supporting plate through hole. Through such arrangement, the fixed clamping seat and the supporting plate are better matched with each other. An angle of the supporting plate is conveniently regulated by controlling the fixed clamping seat, facilitating use of the user.

Further, a base clamping groove is formed in the base. The first sliding seat is provided with a third clamping column used to fix with the base clamping groove. The third clamping column comprises a third protrusion. The third protrusion is clamped with the base clamping groove. This clamping structure is assembled very conveniently, thereby increasing production efficiency, and is also disassembled very conveniently, thereby facilitating replacement of the components and realizing economy and environmental protection.

Further, an elastic component is arranged between the pressing device and the supporting plate. The elastic component is arranged on the regulating rod. A fixing seat for limiting is arranged at one end of the elastic component. The fixing seat is sleeved on the regulating rod. The fixing seat is connected to the supporting plate. In this way, the elastic component is better limited to prevent the elastic component from separating from the regulating rod. The pressing device is pressed to regulate the fixed clamping seat and the first clamping groove very conveniently to a separated state, thereby facilitating regulation of an angle between the base and the supporting plate. After regulation is completed, the elastic component better rebounds and resets the fixed clamping seat so that good fixation is formed between the base and the supporting plate and the use of the bracket is more reliable and safer.

Further, the fixing seat comprises a fourth clamping column matched with the supporting plate clamping groove. A fourth protrusion is arranged on the fourth clamping column. The fourth protrusion is matched with the supporting plate clamping groove. In this way, not only the fixing seat is limited, but also torsion resistance of the fourth clamping column is strengthened, so that the fixing seat is more durable.

Further, the connection portion comprises a second sliding seat. The second sliding seat is provided with a second convex ring. The fixing seat comprises a first clamping ring located in the second sliding seat. The first clamping ring is fixed to the fixing seat through the fourth protrusion. In this way, the second sliding seat is closer to the supporting plate under an effect of the elastic component, so that the bracket is more durable and difficult to become loose.

In the present disclosure, due to adoption of the pressing device, the contact area for operating the regulating rod by the user is increased and the pressing operation brings more comfort. The user can operate the regulating rod through the pressing device more conveniently. The fixed clamping seat is better regulated through the regulating rod, so that separation of the fixed clamping seat and the first clamping groove is regulated freely. The fixed clamping seat and the first clamping groove are regulated to a separated state, so as to better regulate the angle between the base and the supporting plate, facilitate the placement of different mobile phones or tablet personal computers and other handheld devices and facilitate the user to find a proper angle to use. By pressing the fixed clamping seat or through automatic resilience, the fixed clamping seat and the first clamping groove are in a clamped state and good fixation is formed between the base and the supporting plate. The use of the bracket is more reliable and safer, thereby better protecting the handheld devices placed on the bracket.

In the figures: 1 base; 11 base clamping groove; 2 connection portion; 21 first sliding seat 211 first clamping groove; 212 first convex ring; 213 third clamping column; 214 third protrusion; 22 fixed clamping seat; 221 first clamping column; 222 second clamping column; 223 first protrusion; 224 second protrusion; 23 second sliding seat; 231 second convex ring; 24 fixing seat; 241 first clamping ring; 242 fourth clamping column; 243 fourth protrusion; 25 regulating rod; 26 elastic component; 3 supporting plate; 31 supporting plate through hole; 32 supporting plate clamping groove; 4 pressing device; 41 pressing cover; 411 fixing buckle; 412 regulating rod butting rod; 42 fixing portion; 421 fixing through hole; and 422 fixing bayonet.

DETAILED DESCRIPTION

The present disclosure will be further described below in combination with the drawings and preferred embodiments.

Figure 1:
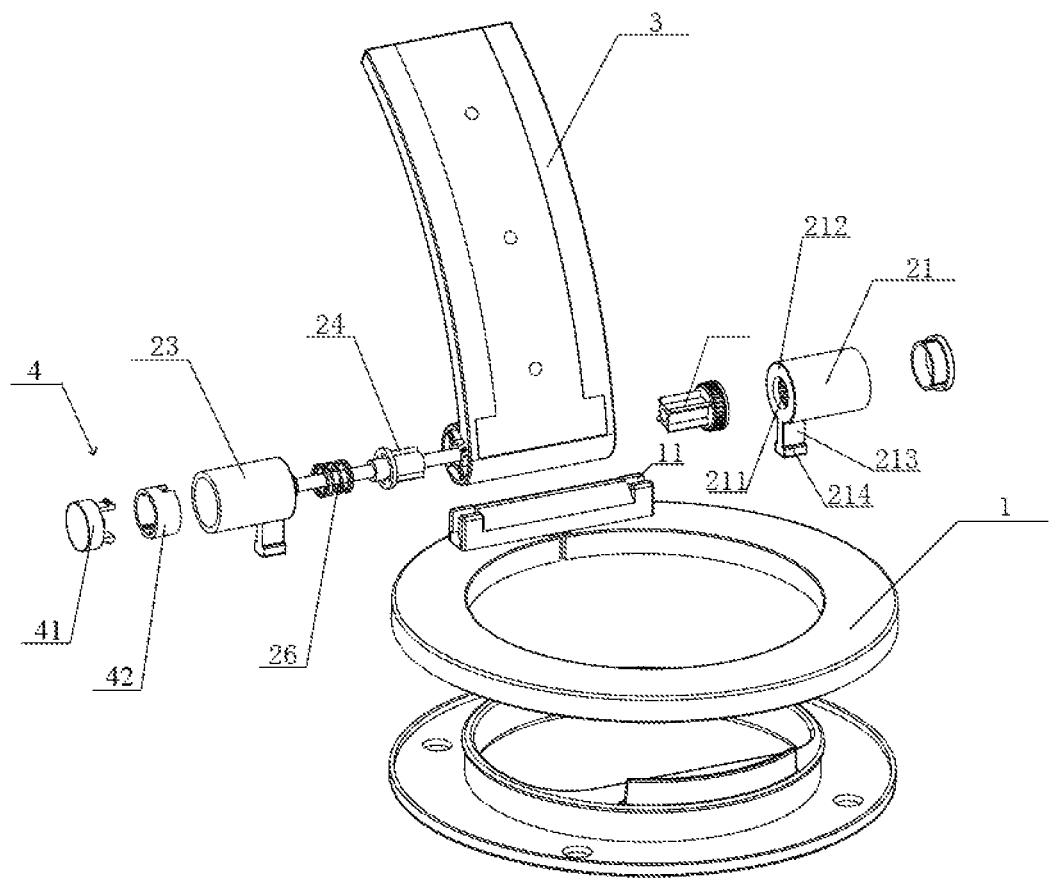
FIG. 1 is an exploded diagram of a portable mobile phone bracket according to an embodiment of the present disclosure.
Figure 2:
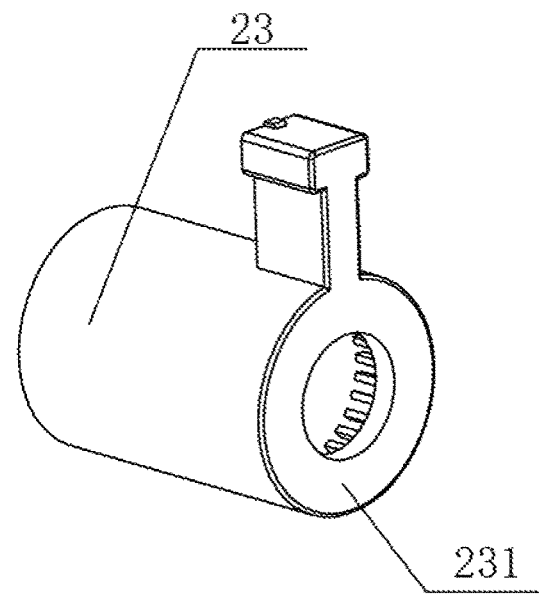
FIG. 2 is a three-dimensional diagram of a second sliding seat according to an embodiment of the present disclosure.
Figure 3:
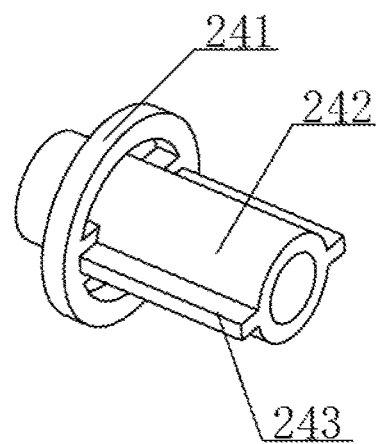
FIG. 3 is a three-dimensional diagram of a fixing seat according to an embodiment of the present disclosure.
Figure 4:
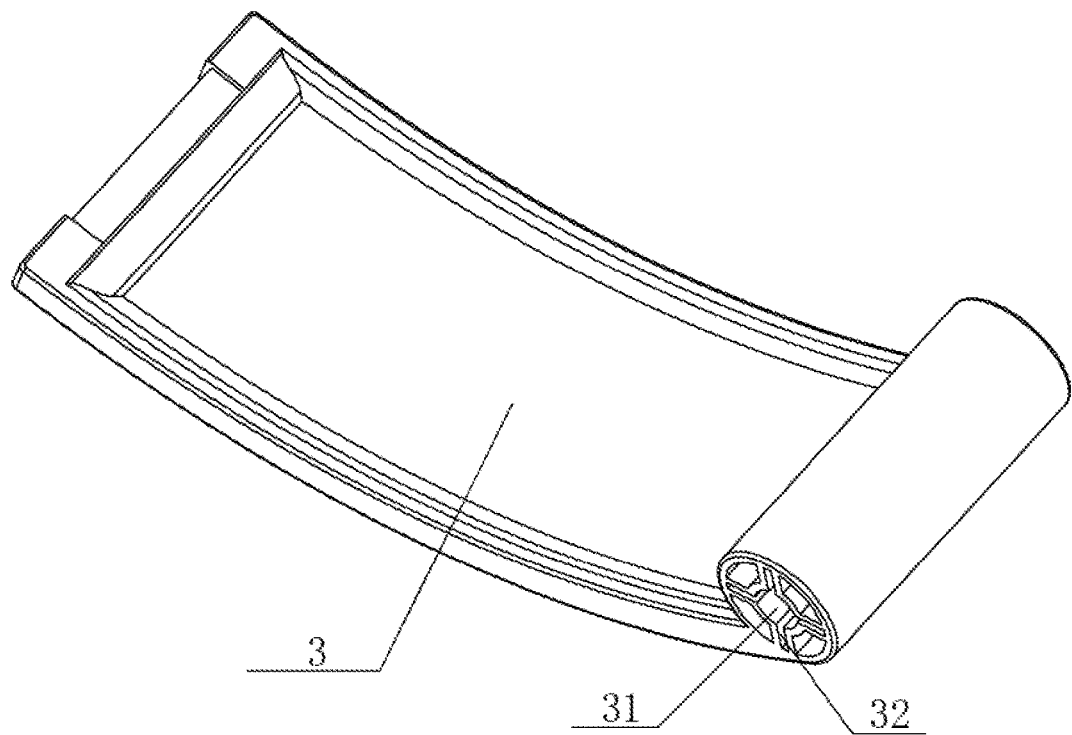
FIG. 4 is a three-dimensional diagram of a supporting plate according to an embodiment of the present disclosure.
Figure 5:
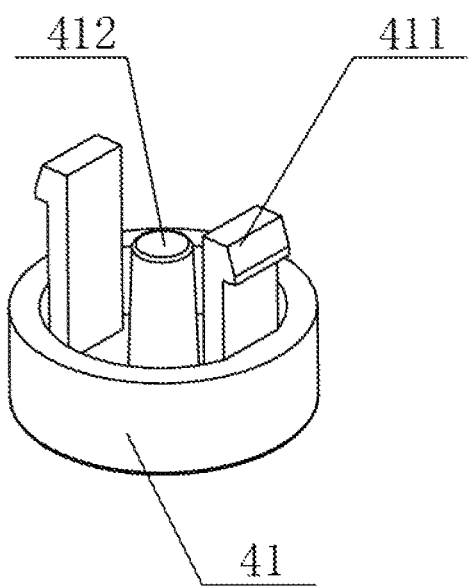
FIG. 5 is a three-dimensional diagram of a pressing cover according to an embodiment of the present disclosure.
Figure 6:
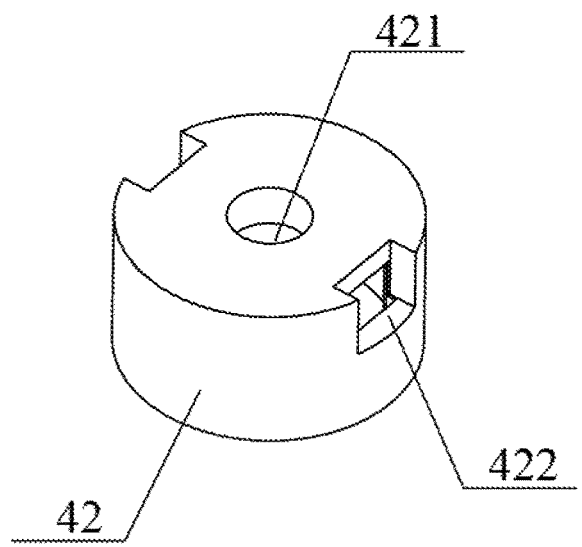
FIG. 6 is a three-dimensional diagram of a fixing portion according to an embodiment of the present disclosure.

Embodiments of the present disclosure disclose a portable mobile phone bracket. As shown in FIG. 1 the portable mobile phone bracket comprises a base 1. A supporting plate 3 is arranged on the base 1. The base 1 is connected to the supporting plate 3 through a connection portion 2. The connection portion 2 comprises the first sliding seat 21 fixed with the base 1. A first clamping groove 211 used for fixation is formed in the first sliding seat 21. The connection portion 2 comprises a fixed clamping seat 22 latched with the first clamping groove 211. The fixed clamping seat 22 drives the supporting plate 3 to rotate. The connection portion 2 comprises a regulating rod 25 used to regulate the fixed clamping seat 22 to match with the first clamping groove 211. The regulating rod 25 is axially movable. The regulating rod 25 penetrates through one end of the supporting plate 3 and is fixedly connected to the fixed clamping seat 22. The other end of the regulating rod 25 is provided with a pressing device 4. Due to adoption of the pressing device 4, the contact area for operating the regulating rod 25 by the user is increased and the operation brings more comfort. The user can operate the regulating rod 25 through the pressing device 4 more conveniently. The fixed clamping seat 22 is, better regulated through the regulating rod 25, so that separation of the fixed clamping seat 22 and the first clamping groove 211 is regulated freely. The fixed clamping seat 22 and the first clamping groove 211 are regulated to a separated state, so as to better regulate the angle between the base 1 and the supporting plate 3, facilitate the placement of different mobile phones or tablet personal computers and other handheld devices and facilitate the user to find a proper angle to use. By pressing the fixed clamping seat 22, the fixed clamping seat 22 and the first clamping groove 211 are in a clamped state and good fixation is formed between the base 1 and the supporting plate 3. The use of the bracket is more reliable and safer, thereby better protecting the handheld devices placed on the bracket.

As shown in FIG. 1 to FIG. 6, the pressing device 4 comprises a pressing cover 41 and a fixing portion 42. The fixing portion 42 is designed into a cylinder which is open at one end. A fixing through hole 421 is formed at the other end of the fixing portion. The fixing portion 42 is sleeved on the regulating rod 25 through the fixing through hole 421, so as to facilitate installation and fixation of the fixing portion 42. The regulating rod 25 is fixedly connected to the fixing portion 42 through the fixing through hole 421. The pressing cover 41 is matched with the fixing portion 42. The regulating rod 25 is controlled very conveniently through the pressing cover 41.

Two fixing buckles 411 are symmetrically arranged on the pressing cover 41. Bevels for facilitating the installation are arranged at ends of the fixing buckles 411. Two fixing bayonets 422 are arranged on a side wall of the fixing portion 42. The fixing buckles 411 and the fixing bayonets 422 are matched and connected through buckles. Of course, a plurality of fixing buckles 411 and the same number of corresponding fixing bayonets 422 can be arranged, to facilitate assembly of the pressing cover 41 and the fixing portion 42. This manner ensures firm fixation, greatly enhances durability of the bracket, also ensures convenient d simple disassembly, facilitates replacement of components and realizes economy and environmental protection.

A regulating rod butting rod 412 is arranged on the pressing cover 41. The regulating rod butting rod 412 is designed into a circular truncated cone, and certainly, can be designed into other cone-shaped structures. In this way, the regulating rod butting rod 412 performs more firm fixation. An end of the regulating rod butting rod 412 comes into close contact with an end of the regulating rod 25. When the pressing cover 41 and the fixing portion 42 are installed together, the regulating rod butting rod 412 butts the end of the regulating rod 25 to better enhance tight connection between the fixing portion 42 and the regulating rod 25, thereby playing a dual-fixation effect, so that the bracket is more durable.

The first protrusion 223 matched with the first clamping groove 211 is arranged on the fixed clamping seat 22. The fixed clamping seat 22 comprises a first clamping column 221 located in the first sliding seat 21, and a second clamping column 222 matched with the supporting plate 3. The first protrusion 223 is arranged on the first clamping column 221. One end of the first sliding seat 21 is provided with a first convex ring 212 extending radially to limit the first clamping column 221. Through such arrangement, a good fixation effect is played to the fixed clamping seat 22. Meanwhile, the fixed clamping seat 22 is limited to prevent the fixed clamping seat 22 from sliding out due to improper control. Meanwhile, clamping and separation of the fixed clamping seat 22 and the first clamping groove 211 are easily controlled, thereby better regulating an inclined angle of the supporting plate 3 and bringing convenient use.

Second protrusions 224 are arranged on the second clamping column 222. Four second protrusions 224 are uniformly arranged on an external circumferential surf ice of the second clamping column 222. Through such arrangement, the fixed clamping seat 22 is well fixed to the supporting plate. The four second protrusions 224 are arranged, so as to better enhance torsion resistance strength and ensure that the supporting plate 3 is regulated within an adjustable range while the fixed clamping seat 22 is difficult to damage. A diameter of the first clamping column 221 is greater than a diameter of the second clamping column 222. A length of the first clamping column 221 is less than a length of the second clamping column 222. Through such arrangement, the fixed clamping seat 22 is better limited to present the fixed clamping seat 22 from separating from the supporting plate 3 during operation. A supporting plate through hole 31 is formed in the supporting plate 3. Such design of the through hole further reduces weight of the bracket and facilitates carrying and use. A supporting plate clamping groove 32 matched with the second protrusion 224 is formed in the supporting plate through hole 31. Through such arrangement, the fixed clamping seat 22 and the supporting plate 3 are better matched with each other. An angle of the supporting plate 3 is conveniently regulated by controlling the fixed clamping seat 22, facilitating use of the user.

A base clamping groove 11 is formed in the base 1. The first sliding seat 21 is provided with a third clamping column 213 used to fix with the base clamping groove 11. The third clamping column 213 comprises a third protrusion 214. The third protrusion 214 is clamped with the base clamping groove 11. This clamping structure is assembled very conveniently, thereby increasing production efficiency, and is also disassembled very conveniently, thereby facilitating replacement of the components and realizing economy and environmental protection.

An elastic component 26 is arranged between the pressing device 4 and the supporting plate 3. The elastic component 26 is arranged on the regulating rod 25. A fixing seat 24 for limiting is arranged at one end of the elastic component 26. The fixing seat 24 is sleeved on the regulating rod 25. Such arrangement is convenient for assembly and disassembly of the elastic component 26 and the fixing seat 24. The fixing seat 24 is connected to the supporting plate 3. In this way, the elastic component 26 is better limited to prevent the elastic component 26 from separating from the regulating rod 25. The pressing device 4 is pressed to regulate the fixed clamping seat 22 and the first clamping groove 211 very conveniently to a separated state, thereby facilitating regulation of an angle between the base 1 and the supporting plate 3. After regulation is completed, the elastic component 26 better rebounds and resets the fixed clamping seat 22 so that good fixation is formed between the base 1 and the supporting plate 3 and the use of the bracket is more reliable and safer, thereby better protecting the handheld devices placed on the bracket.

The fixing seat 24 comprises a fourth clamping column 242 matched with the supporting plate clamping groove 32. A fourth protrusion 243 is arranged on the fourth clamping column 242. The fourth protrusion 243 not only limits the fixing seat 4, but also strengthens torsion resistance of the fourth clamping column 242, so that the fixing seat 24 is more durable.

The connection portion 2 comprises a second sliding seat 23. The second sliding seat 23 is provided with a second convex ring 231. The fixing seat 24 comprises a first clamping ring 241 located in the second sliding seat 23. The first clamping ring 241 is fixed to the fixing seat 24 through the fourth protrusion 243. In this way, the second sliding seat 23 is closer to the supporting plate 3 under an effect of the elastic component 26, so that the bracket is more durable and difficult to become loose.

The above contents are further detailed descriptions of the present disclosure in combination with specific preferred embodiments. However, the concrete implementation of the present disclosure shall not be considered to be only limited to these descriptions. For those ordinary skilled in the art to which the present disclosure belongs, several simple deductions or replacements may be made without departing from the conception of the present disclosure, all of which shall be considered to belong to the protection scope of the present disclosure.

The invention claimed is:

1. A portable mobile phone bracket, comprising a base, wherein a supporting plate is arranged on the base; the base is connected to the supporting plate through a connection portion; the connection portion comprises a first sliding seat fixed with the base; a first clamping groove used for fixation is formed in the first sliding seat; the connection portion comprises a fixed clamping seat matched with the first clamping groove; the fixed clamping seat drives the supporting plate to rotate; the connection portion comprises a regulating rod used to regulate the fixed clamping seat to match with the first clamping groove; the regulating rod is axially movable; the regulating rod penetrates through one end of the supporting plate and is fixedly connected to the fixed clamping seat; and the other end of the regulating rod is provided with a pressing device;

the pressing device comprises a pressing cover and a fixing portion; a fixing through hole is formed in the fixing portion; the regulating rod is fixedly connected to the fixing portion through the fixing through hole; and the pressing cover is matched with the fixing portion.

2. The portable mobile phone bracket according to claim 1, wherein a fixing buckle is arranged on the pressing cover; a fixing bayonet is arranged on the fixing portion; and the fixing buckle and the fixing bayonet are matched and connected through a buckle.

3. The portable mobile phone bracket according to claim 2, wherein a regulating rod butting rod is arranged on the pressing cover; and an end of the regulating rod butting rod comes into close contact with an end of the regulating rod.

4. A portable mobile phone bracket, comprising a base, wherein a supporting plate is arranged on the base; the base is connected to the supporting plate through a connection portion; the connection portion comprises a first sliding seat fixed with the base; a first clamping groove used for fixation is formed in the first sliding seat; the connection portion comprises a fixed clamping seat matched with the first clamping groove; the fixed clamping seat drives the supporting plate to rotate; the connection portion comprises a regulating rod used to regulate the fixed clamping seat to match with the first clamping groove; the regulating rod is axially movable; the regulating rod penetrates through one end of the supporting plate and is fixedly connected to the fixed clamping seat; and the other end of the regulating rod is provided with a pressing device; wherein the first protrusion matched with the first clamping groove is arranged on the fixed clamping seat; the fixed clamping seat comprises a first clamping column located in the first sliding seat, and a second clamping column matched with the supporting plate; the first protrusion is arranged on the first clamping column; and one end of the first sliding seat is provided with a first convex ring extending radially to limit the first clamping column.

5. The portable mobile phone bracket according to claim 4, wherein a second protrusion is arranged on the second clamping column; a supporting plate through hole is formed in the supporting plate; and a supporting plate clamping groove matched with the second protrusion is formed in the supporting plate through hole.

6. The portable mobile phone bracket according to claim 4, wherein a base clamping groove is formed in the base; the first sliding seat is provided with a third clamping column used to fix with the base clamping groove; the third clamping column comprises a third protrusion; and the third protrusion is clamped with the base clamping groove.

7. A portable mobile phone bracket, comprising a base, wherein a supporting plate is arranged on the base; the base is connected to the supporting plate through a connection portion; the connection portion comprises a first sliding seat fixed with the base; a first clamping groove used for fixation is formed in the first sliding seat; the connection portion comprises a fixed clamping seat matched with the first clamping groove; the fixed clamping seat drives the supporting late to rotate; the connection portion comprises a regulating rod used to regulate the fixed clamping seat to match with the first clamping groove; the regulating rod is axially movable; the regulating rod penetrates through one end of the supporting plate and is fixedly connected to the fixed clamping seat; and the other end of the regulating rod is provided with a pressing device; wherein an elastic component is arranged between the pressing device and the supporting plate; the elastic component is arranged on the regulating rod; a fixing seat for limiting is arranged at one end of the elastic component; the fixing seat is sleeved on the regulating rod; and the fixing seat is connected to the supporting plate.

8. The portable mobile phone bracket according to claim 7, wherein the fixing seat comprises a fourth clamping column matched with the supporting plate clamping groove; a fourth protrusion is arranged on the fourth clamping column; and the fourth protrusion is matched with the supporting plate clamping groove.

9. The portable mobile phone bracket according to claim 8, wherein the connection portion comprises a second sliding seat; the second sliding seat is provided with a second convex ring; the fixing seat comprises a first clamping ring located in the second sliding seat; and the first clamping ring is fixed to the fixing seat through the fourth protrusion.

* * * * *